Dec. 14, 1971  G. J. FREY  3,626,617
SLIDE VIEWER
Filed March 27, 1970
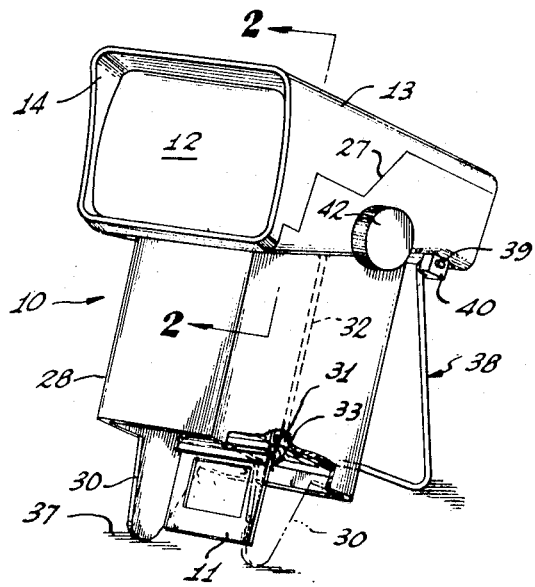
Fig.1
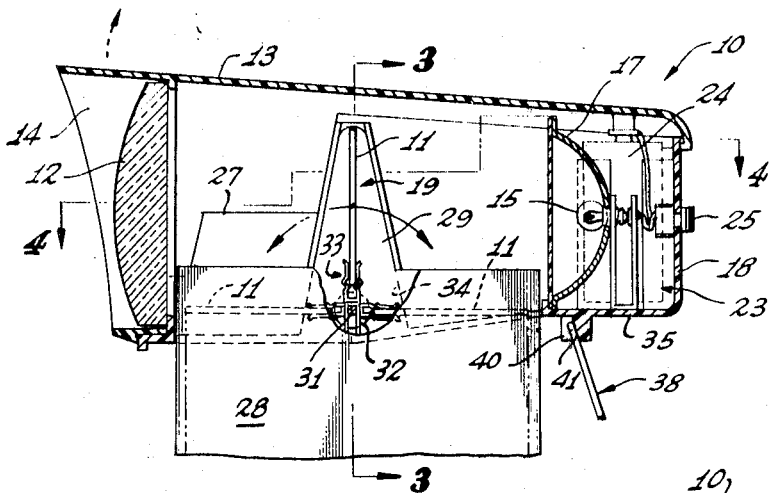
Fig.2
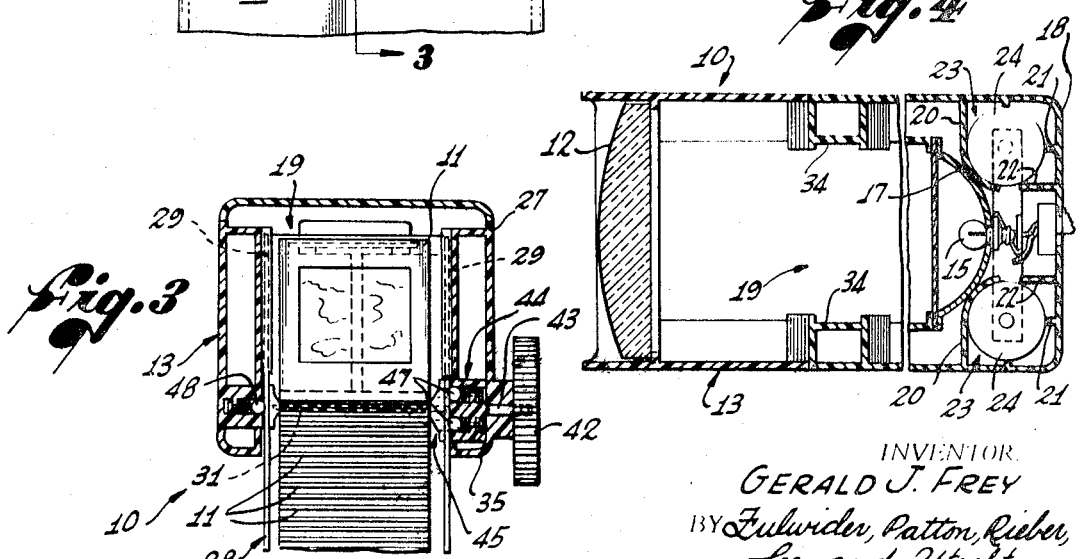
Fig.3
Fig.4
INVENTOR.
GERALD J. FREY
BY Fulwider, Patton, Rieber,
Lee, and Utecht
ATTORNEYS

United States Patent Office

3,626,617
Patented Dec. 14, 1971

3,626,617
SLIDE VIEWER
Gerald J. Frey, 1834 Devon Road,
Pasadena, Calif. 91103
Filed Mar. 27, 1970, Ser. No. 23,229
Int. Cl. G09f *11/14*
U.S. Cl. 40—98             13 Claims

ABSTRACT OF THE DISCLOSURE

A slide viewing device of basically conventional construction having a recess in its underside receiving the open upper end of a box-like slide magazine and properly positioned in the viewer for projection of a slide in the magazine toward a viewing lens of the viewer, which is coupled to a movable slide carrier of the magazine for manual feeding of the slides. The magazine and a foldable wire stand on the viewer cooperate to support the latter on a table.

BACKGROUND OF THE INVENTION

This invention relates to a device for viewing transparent slides of the type intended for projection on a screen with a slide projector. Such slide-viewing devices are known in the art, typically including an outer case with a viewing lens in one side and a light source inside the case for illuminating a slide inserted into the case and projecting an image from the slide toward the lens for direct observation.

A slide viewer provides a simple and convenient way to examine a slide or group of slides without going to the trouble of setting up a screen and a projector, and also provides a convenient way to display slides when a projector is not available. Typically, slides are inserted one by one into the viewer and illuminated momentarily during viewing through the lens.

SUMMARY OF THE INVENTION

The present invention resides in the combination of a viewer of basically conventional construction with a slide magazine designed for use in a slide projector to support a series of slides on a carrier for movement one by one through a projection position at one end of the magazine, the viewer being mountable directly on the magazine and having a stand thereon which cooperates with the magazine itself to support the viewer in an upright viewing position. Included on the viewer is a manually rotatable feed element which is coupled to the carrier of the magazine when the viewer is in place thereon, thus enabling the user to feed the slides selectively through the projection position for scanning or viewing of the full series of slides, or of any one or more slides in the series.

More specifically, the viewer is adapted for use with a magazine for a slide projector of the type shown generally in Pat. No. 3,170,369 and in more detail in my pending application Ser. No. 865,613, filed Oct. 13, 1969, entitled Magazine-Type Slide Projector. The magazine is simply inserted in a recess in the underside of the viewer case, being simultaneously positioned relative to and coupled to the viewer, and thereafter forms a leg cooperating with a foldable stand to support the viewer in the desired attitude for use. The feed element is a knob coupled to the carrier by a releasable clutch, and two sets of lugs on the upper and lower ends of the magazine serve, respectively, as positioning elements and as protective elements for slides at the lower end of the magazine.

Other objects and advantages of the invention will become apparent from the following detailed description, taken in conjunction with the accompanying drawings.

BRIEF DESCRIPTION OF THE DRAWINGS

FIG. 1 is a perspective view of a slide viewer and magazine embodying the novel features of the present invention, partly broken away and shown in cross-section;

FIG. 2 is an enlarged fragmentary cross-sectional view taken substantially along the line 2—2 of FIG. 1, with part of the upper end portion of the magazine broken away for clarity;

FIG. 3 is a fragmentary cross-sectional view taken substantially along the line 3—3 of FIG. 2; and FIG. 4 is a fragmentary cross-sectional view taken substantially along the line 4—4 of FIG. 2 with the magazine removed.

DETAILED DESCRIPTION

As shown in the drawings, the invention is embodied in a device 10 for viewing transparent slides 11 which normally are to be projected onto a screen by a slide projector but may be examined more conveniently under some circumstances by placing the slides in the viewer and illuminating each slide temporarily for direct observation through a viewing window or lens 12 on one side of the viewer. To this extent, the viewer is of basically conventional construction including an outer case 13 of generally rectangular, rearwardly tapering cross-section with the viewing lens mounted in its front wall and surrounded by a rectangular flange 14, and a light source 15 in the form of a lamp held in a socket in a concave reflector 17 adjacent the rear wall 18 of the case to project light forwardly toward the viewing lens and through a projection position 19 in the central portion of the case. When a slide is positioned in the projection position and the lamp is turned on, an image is projected toward the lens and can be viewed from the front of the case.

In the illustrative viewer, the lamp 15 and the reflector 17 are of the type used in flashlights and are held in place by internal partitions 20, 21 and 22 as shown in FIG. 4. Adjacent each rear corner of the case, these partitions define recesses 23 for holding two battery cells 24 which are electrically connected to the lamp through an energizing circuit including an ON-OFF switch 25, herein on the rear wall 18 of the case. For convenient access to the parts, the case may be made in two parts which fit together along the irregular line shown at 27.

In accordance with the present invention, the viewer 10 is mounted on a slide magazine 28 of the type described in my aforementioned patent application for use in a slide projector, is coupled to the magazine for selective manual feeding of slides therein into the projection position in the viewer case 13, and utilizes the magazine as one leg of a support for holding the viewer in an upright viewing position during use. In this manner, the viewer is adapted for convenient use in viewing some, or all, of the slides stored in the magazine without the necessity of setting up a screen and the regular projector, thus providing a very useful accessory for a projector of the type shown in the aforesaid application.

The illustrative magazine 28 comprises a box-like body of rectangular horizontal cross-section having open upper and lower ends each having a pair of V-shaped lugs 29, 30 thereon extending away from the body in the planes of the sidewalls. Adjacent the open ends are two transverse shafts 31, the upper shaft being shown in FIGS. 2 and 3 and the lower shaft in FIG. 1. These shafts are journaled on the sidewalls of the magazine and extend across the interior thereof in alignment with the adjacent set of lugs 29, 30. An endless flexible carrier in the form of a belt 32 is trained around these shafts and has a plurality of closely spaced, parallel spring clips 33 fastened to the belt in transversely extending relation to receive and hold a series of sides 11 in the manner shown in FIGS. 1–3. As the carrier is advanced within the magazine, successive slides are moved onto the top of the upper shaft 31 to extend upwardly between the upper lugs 29.

When the viewer 10 is in place on top of the magazine 28, the upper lugs 29 are snugly received in two inverted V-shaped seats 34 of upwardly tapering width formed on the opposite sidewalls of the case 13 as shown in FIG. 4 to hold the viewer securely in a preselected position relative to the carrier and the upwardly extending slide 11 thereon, this slide being positioned in the projection position 19 between the lamp 15 and the lens 12. While a limited degree of play is possible in the position of this slide, it is located with sufficient precision for the purposes of the viewer.

It will be seen in FIG. 1 that the magazine 28 extends a substantial distance below the viewer 10, generally perpendicular to its underside 35, and that the lower lugs 30 are positioned on opposite sides of a slide 11 projecting downwardly from the lower shaft 31 to engage a supporting surface 37, such as a table, below the lower end of this slide. In this manner, the lugs 30 protect all of the slides against possibly damaging contact with the table, as well as constituting the lower end of the supporting leg formed by the magazine. The illustrative magazine is of a size that may hold about one hundred slides.

To complete the support for the viewer 10, a wire stand 38, bent into the general shape of a U, is pivotally attached to the rear portion of the underside 35 of the case 13 to engage the table 37 behind the magazine. Herein, the free end portions 39 (FIG. 1) of the two upright legs of the stand are bent outwardly and rotatably received in two holes in tags 40 adjacent the two rear corners of the case, and an abutment 41 (FIG. 2) is formed on the case beside each tab to limit rearward pivoting of the stand in the selected angular position, shown in FIG. 1, in which the stand is upright but inclined slightly toward the rear. Thus the stand is swingable between the operative position shown in FIG. 1 and a folded, storage position (not shown) against the underside of the case, and cooperates with the magazine to support the viewer in a preselected viewing position, preferably with an upward incline toward the front of the case.

To couple the viewer 10 to the belt 32 of the carrier for feeding of the slides 11 in the magazine, a knob 42 is rotatably mounted on one side of the case 13 on a shaft 43 (FIG. 3) journaled in the case, with a releasable clutch element 44 on the inner end of the shaft positioned for coupling engagement with a second clutch element 45 on the adjacent end of the upper magazine shaft 31 when the viewer is in place on the magazine. Herein, the first clutch element 44 is a disk fast on the the inner end of the shaft 43 and carrying balls 47 that are spring-urged inwardly, and the second element 45 is coaxial disk on the upper magazine shaft with recesses for receiving the balls to drivingly couple the two disks together as an incident to the insertion of the magazine in the case. Thus, when the knob 42 is turned in either direction, the upper magazine shaft 31 is turned in the same direction to feed slides through the projection position.

A spring-loaded ball detent 48 (FIG. 3) preferably is provided on the side of the case opposite the knob 42 and the shaft 43, in axial alignment therewith, to seat releasably in a detent recess in the adjacent side of the magazine, thereby latching the magazine securely, but releasably, in the case 13.

From the foregoing, it will be seen that the present invention provides a slide viewer 10 that is adapted simply and inexpensively for use in combination with a slide magazine 28 of the character described, in a manner that permits rapid and convenient viewing of all or part of the slides 11 in the magazine. Moreover, the magazine cooperates with a simple stand 38 to support the viewer in a selected attitude during use. It also will be evident that, while a specific embodiment of the invention has been illustrated and described, various modifications and changes may be made without departing from the spirit and scope of the invention.

I claim:

1. In combination with a slide magazine having an upright box-like body with open upper and lower ends, a pair of shafts spaced apart to lie adjacent said open ends and journaled on said magazine, an endless flexible belt trained around said shafts, a plurality of transverse clips on said belt for holding a series of slides to be viewed and advancing the slides one by one around an endless path defined by said belt, and a pair of laterally spaced lugs projecting away from each of said open ends on opposite sides of the position of a slide extending away from the adjacent shaft through the adjacent open end of said body;
   a slide viewer having:
   a box-like case with a recess in its underside for receiving the upper end of said magazine;
   means on said case for receiving the lugs on said upper end and locating the case in a preselected position on said magazine;
   means for holding a selectively operable light source in said case behind the position of successive slides projecting upwardly from the upper shaft of the magazine thereby to project an image from the slide toward the front of the case;
   a viewing lens mounted on the front of said case to receive said image;
   a stand connected at its upper end to said case and having a lower end for engaging a supporting surface behind the lower end of said magazine, whereby the stand and the lugs on the lower end of the magazine cooperate to hold the latter in an upright position for viewing of slides;
   and means on said viewer drivingly coupled to said upper shaft to feed successive slides into position to be viewed.

2. The combination defined in claim 1 in which said last-mentioned means include a knob rotatably mounted on said case for manual turning, and a clutch coupling said knob releasably to said upper shaft.

3. The combination defined in claim 1 in which said stand is a generally U-shaped wire having upper ends pivotally connected to the underside of said case adjacent the rear side thereof and swingable upwardly and forwardly into closely spaced relation with said underside in a storage position, and further including means stopping rearward and downward swinging of said stand when the latter is upright and in a preselected angular position relative to said case.

4. The combination defined in claim 3 in which said preselected angular position is correlated with the position of said lower lugs to hold said case in an upwardly and forwardly inclined position when the viewer is resting on said lugs and said stand.

5. The combination defined in claim 1 in which said holding means include a socket and reflector for a lamp, disposed behind the position of said upwardly extending slides, and further including means inside said case defining a battery-holding recess behind said reflector.

6. The combination defined in claim 2 in which said knob is mounted on a shaft extending into said case, and said clutch comprises a first clutch element on said shaft releasably engaging a second clutch element on said upper shaft.

7. The combination defined in claim 6 further including a yieldable detent on the side of said case opposite said knob and releasably engaging said magazine.

8. In combination with a slide magazine having a body with at least an open upper end, a slide carrier within said body for holding a series of slides in outwardly extending relation with said carrier, and means mounting the carrier in said body for movement along an endless path and feeding successive slides on the carrier into a projection position extending upwardly and outwardly through said upper end;

a slide viewer mountable on said upper end of said magazine around said projection position and having means for holding a selectively operable light source on one side of said projection position, and having a viewing lens aligned with said light source and said projection position to receive an image projected from a slide in the projection position;

said magazine having a lower end for engaging a supporting surface below said viewer;

means on said viewer cooperating with said magazine to support said viewer in an upright viewing position;

and means on said viewer drivingly coupled to said carrier for advancing the latter and feeding slides one by one through said projection position.

9. The combination defined in claim 8 in which said cooperating supporting means include a stand having an upper end connected to said viewer and a lower end engageable with said supporting surface in spaced relation with the lower end of said magazine.

10. The combination defined in claim 9 in which said stand is a generally U-shaped element having spaced upper ends pivotally connected to said viewer so as to be folded into a storage position against the underside of the viewer, and further including stop means limiting swinging of the stand away from said underside when the stand is in a preselected upright position for engagement with said supporting surface.

11. The combination defined in claim 8 in which said magazine has an open lower end similar to said open upper end, and a pair of lugs projecting downwardly from said open lower end on opposite sides of the position of slides projecting downwardly from said carrier, thereby to engage said supporting surface below such slides.

12. The combination defined in claim 11 in which said magazine has a similar pair of second lugs on its upper end on opposite sides of said projection position, and said viewer has internal seats for receiving said second lugs and cooperating therewith to position said viewer relative to said projection position.

13. The combination defined in claim 8 in which said means drivingly coupled to said carrier includes a knob disposed outside said viewer and rotatably supported thereon for manual turning, and means releasably connecting said knob to said carrier.

References Cited

UNITED STATES PATENTS

| | | | |
|---|---|---|---|
| 385,838 | 7/1888 | Boussemaere | 40—98 |
| 485,464 | 11/1892 | Fawkes | 40—98 |
| 1,352,471 | 9/1920 | Patterson | 353—109 |
| 2,336,978 | 12/1943 | Bodde | 353—109 |
| 2,454,233 | 11/1948 | Strumor | 353—109 X |
| 2,521,348 | 9/1950 | Davis | 40—98 |
| 3,170,369 | 2/1965 | Frey et al. | 353—85 |

ROBERT W. MICHELL, Primary Examiner

R. CARTER, Assistant Examiner

U.S. Cl. X.R.

40—73.4; 353—109